United States Patent
Fauconnier (10) Patent No.: US 6,868,520 B1
(45) Date of Patent: Mar. 15, 2005

(54) METHOD AND APPARATUS FOR PROVIDING HIGH QUALITY TRANSMISSIONS IN A TELECOMMUNICATIONS SYSTEM

(75) Inventor: Denis Fauconnier, Saint-Remy les Chevreuse (FR)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/831,421

(22) PCT Filed: Oct. 29, 1999

(86) PCT No.: PCT/EP99/08273

§ 371 (c)(1),
(2), (4) Date: Aug. 24, 2001

(87) PCT Pub. No.: WO00/28692

PCT Pub. Date: May 18, 2000

(30) Foreign Application Priority Data

Nov. 6, 1998 (EP) .............................................. 98402761

(51) Int. Cl.⁷ ............................................. H03M 13/00
(52) U.S. Cl. .................................................... 714/790
(58) Field of Search ............................... 714/752, 746, 714/755, 786, 790

(56) References Cited

U.S. PATENT DOCUMENTS

| | | | |
|---|---|---|---|
| 4,447,903 A | | 5/1984 | Sewerinson ................... 714/820 |
| 4,953,197 A | * | 8/1990 | Kaewell, Jr. et al. ..... 455/562.1 |
| 5,268,909 A | * | 12/1993 | Loebig ......................... 714/800 |
| 5,406,563 A | * | 4/1995 | Loebig ......................... 714/704 |
| 5,422,647 A | * | 6/1995 | Hirshfield et al. ........... 342/354 |
| 5,436,915 A | * | 7/1995 | Loebig ......................... 714/797 |
| 5,438,590 A | * | 8/1995 | Tzukerman et al. ......... 375/259 |
| 5,483,668 A | * | 1/1996 | Malkamaki et al. ......... 455/442 |
| 5,577,047 A | * | 11/1996 | Persson et al. .............. 370/333 |
| 5,657,325 A | | 8/1997 | Lou ............................. 370/334 |

FOREIGN PATENT DOCUMENTS

WO    WO 00/28692    5/2000

OTHER PUBLICATIONS

Berrou et al., Near shannon limit error–correcting coding and decoding: Turbo–codes (1), 1993, IEEE, p. 1064–1070.*

Sakai, "Soft–Decision Viterbi Decoding with Diversity Combining for Multi–Beam Mobile Satellite Communication Systems", IEEE Journal on Selected area in Comminications, vol. 15, No. 2, Feb., 1995, pp. 285–290.

Benelli, "Two New Coding Techniques for Diversity Communication Systems", IEEE Transactions on Communications, vol. 38, No. 9, Sep. 1, 1990, pp. 1530–1538.

Matsumoto, "Combined Convolutional Coding/Diversity Reception for QDPSK Land Mobile Radio", IEICE Transactions,, vol. E74, No. 6, Jun. 1, 1991, pp. 1922–1530.

* cited by examiner

*Primary Examiner*—Shelly A Chase
(74) *Attorney, Agent, or Firm*—Barnes & Thornburg LLP (57) ABSTRACT

A mobile radio telecommunications system is described in which the same user message is transmitted with forward error correction (FEC) codes on three separate channels to a receiver. The FEC codes for the three signals are different, e.g. different bits are punctured in the first signal compared with the second signal and so on. The receiver includes a plurality of data receivers for extracting the receiver signals as well as a forward error correction decoder for substantially simultaneously decoding the differently forward error correction coded signals. The extracted decoded signals can be used individually or combined in a variety of ways to improve reception.

37 Claims, 6 Drawing Sheets

METHOD AND APPARATUS FOR PROVIDING HIGH QUALITY TRANSMISSIONS IN A TELECOMMUNICATIONS SYSTEM

The present invention relates to a method and apparatus for providing high quality transmissions in a telecommunications system. In particular, the present invention may be applied to a mobile radio systems especially those using spread spectrum techniques.

TECHNICAL BACKGROUND

Several methods are known for improving the reliability of data transmitted through a telecommunications network. Parity checking includes the use of parity bits which are appended to bytes, blocks or frames of digital transmissions and allow the determination of some types of transmission errors. Another technique is to send identical data streams along two or more separate paths and then to select the best of the received signals or to combine the received signals in some way to obtain a higher quality result. For instance, it is known from U.S. Pat. No. 4,953,197 to use two receiving antennae in parallel and quality data and parity information are checked for each data word of the two signals received from the antennae and the best signal selected. U.S. Pat. No. 5,268,909, U.S. Pat. No. 5,406,563, U.S. Pat. No. 5,436,915, and U.S. Pat. No. 5,422,647 all provide methods of error checking of two or more transmissions of the same information down different paths of the system.

Yet another technique is known as ARQ or automatic repeat requests in which a byte, frame or block of data is retransmitted automatically when an error is detected therein in the receiver. Examples of such systems are "stop and wait" or "continuous" ARQ. Further, general types of ARQ are known in which not all of the byte, block or frame is re-transmitted but only some additional information which allows the erroneous signal to be corrected, e.g. using forward error correction techniques. This is sometimes known as ARQ with incremental forward error correction.

Forward error correction (FEC) is known in which errors in the transmitted digital signal are corrected without re-transmitting the same signal. This requires a more complex type of error coding in which sufficient additional correction bits are provided that the original message can be reconstructed from a signal transmitted with errors. Examples are the Hagelberger, Bose-Chaudhuri, Hamming, and convolutional and block codes. The number of additional bits necessary to provide reliable correction can be high which reduces the throughput of the system drastically. However, where a high level of quality is required and retransmission cannot be tolerated, the methods are most useful. To reduce the reduction in capacity caused by the additional correction bits the number of bits may be reduced by "puncturing" in which a certain proportion of bits from the forward error coded signal are removed. This reduces the quality and reliability of the error correction but increases the data rate.

Combinations of the above are also used. For example, U.S. Pat. No. 5,657,325 describes a combined ARQ and FEC technique in which a signal is error coded, punctured and then transmitted over a first radio channel from one antenna to a receiver and on receiving a negative acknowledgment from the receiver (the signal cannot be corrected properly at the receiver), the relevant punctured bits are sent via a second antenna, i.e. via a separate channel which may have better transmission quality or may introduce different or less troublesome errors. The disadvantage of this technique is that even retransmission of only the punctured bits introduces temporal latency into the transmission which is often unacceptable, e.g. in voice transmissions in which no delay can be tolerated. Further, it is not possible to reconstruct the complete message from the punctured bits alone and the first message must always be used in the reconstruction attempt. It is therefore possible that if the originally received message contains very many errors it is not possible to reconstruct an accurate copy of the transmitted message.

Cellular telecommunications systems often include some form of compression of voice messages, e.g. a Vector Sum Excited Linear Prediction (VSELP) speech coder, convolutional coding for error protection, some form of modulation, e.g. differential quadrature phase shift keying (QPSK) modulation, and some form of access scheme, e.g. a time division, multiple access (TDMA) scheme or a Code Division Multiple Access (CDMA) scheme employing a frame subdivided into a number of time slots per carrier frequency.

In one known standardized system the error protection scheme utilizes the well known half rate convolutional channel encoder. The half rate convolutional channel encoder adds redundancy to the compressed speech data by using a shift register, generating two output bits for every input bit, and multiplexing the output bits to form the output. The generation of each output bit is done by a weighted modulo 2 sum of the input bit and the shift register contents according to a predefined generator polynomial. The number of memory elements in the shift register plus one is referred to as the constraint length of the convolutional coder. The initial state of the shift register is zeroed out, and the final state is also guaranteed to be zero by flushing it with five tail or flush bits of "0" after every input block of compressed speech data.

The VSELP speech codec puts out 159 compressed speech bits every 20 ms. These bits are divided into two classes. Class 1 bits are bits that are perceptually more significant and therefore require error protection. This is accomplished by the half rate convolutional channel codec with constraint length 6. Class 2 bits are bits that are not as significant as their Class 1 counterparts and are given no error protection. There are 77 Class 1 bits and 82 Class 2 bits. Among the Class 1 bits, there are a few bits that are perceptually the most significant, and it is important that they have error detection capability as well. This is accomplished by using a 7-bit cyclic redundancy check (CRC) over the twelve most perceptually significant bits. The 77 Class 1 bits, the 7 CRC bits, and the 5 tail bits are fed into the convolutional encoder to generate 178 coded bits. These are then fed along with the Class 2 bits into an interleaving array of dimension 26×10, interleaved row-wise with the interleaving array of the previous 20 ms frame, and transmitted row-wise after interleaving.

At the receiving station, de-interleaving is first accomplished to yield the 26×10 array of coded Class 1 and Class 2 bits of the previous 20 ms VSELP frame. After extracting the 178 coded Class 1 bits, the 77 Class 1 bits and 7 CRC bits are decoded using the Viterbi algorithm, which is a special case of dynamic programming. The locally generated 7 CRC bits are compared to the received 7 CRC bits to provide a bad frame indication to the VSELP speech decoder. The error correcting capacity can be increased by increasing the constraint length, but this comes with an exponential increase in cost or complexity of the Viterbi decoder. Known in the art in the use of forward-error-correction that includes convolutional encoding in the transmission of encoded digital data over a noisy channel from a transmitter to a receiver is a branch metric computer for a Viterbi-algorithm based convolutional decoder. The Viterbi Algorithm is used very commonly to decode a convolutionally encoded sequence of bits transmitted over a noisy channel. In the heart of the Viterbi algorithm is a series of repetitive add-compare-select operations which accept as input certain metrics (termed branch metrics) computed on each received symbol from the demodulator. Viterbi coders and decoders as well as convolutional coding are described in "Mobile Radio Communications", by Raymond Steele, Pentech Press, 1992.

It is an object of the present invention to provide a telecommunications system as well as a receiver for the system and a method of operating the system and the receiver which improves the quality of received signals.

SUMMARY OF THE INVENTION

The present invention includes a method of operating a telecommunications system comprising the steps of: transmitting substantially simultaneously over separate first and second telecommunication channels a first and a second forward error correction coded signal, respectively, each of the first and second signals nominally containing the same user information; forward error correction coding at least a portion of the first signal; and forward error correction coding at least a portion of the second signal, the forward error correction coding of the portion of the first signal being different from the forward error correction coding of the portion of the second signal. It is preferred if the original user information may be reconstructed from either a combination of the two signals of the received signals and/or from each of the received signals. In one of the embodiments of the present invention, the signals are punctured whereby the bits which are punctured in the first signal are different from the bits punctured in the second signal. Preferably, the forward error correction code is a convolutional or a turbo code.

The present invention also includes a telecommunications system comprising: one or more transmitters and one or more receivers; the one or more transmitters including one or more forward error correction coders; wherein the one or more transmitters and the one or more forward error correction coders are adapted to transmit a first and a second forward error correction coded signal, each signal nominally containing the same user information, substantially simultaneously over separate first and second telecommunication channels, respectively, the forward error correction coding of the first signal being different from the forward error coding of the second signal. Preferably, the telecommunications system is a cellular radio telecommunications system. Preferably, the transmitter is in a mobile terminal of such a system and the receiver is one or more receivers in one or more cell-site transceivers. Preferably, the mobile telecommunications system uses spread spectrum techniques, e.g. the telecommunications system may be a Code Division Multiple Access (CDMA) system. It is preferred if the original user information may be reconstructed from either a combination of the two signals of the received signals and/or from each of the received signals. In one of the embodiments of the present invention, the signals are punctured whereby the bits which are punctured in the first signal are different from the bits punctured in the second signal. Preferably, the forward error correction code is a convolutional or a turbo code.

The present invention also includes a telecommunications receiver system, comprising: one or more receivers comprising: a forward error correction decoder for substantially simultaneously decoding a first forward error correction coded signal and a second forward error correction coded signal, each of the first and second signals having a different forward error correction coding and each of the first and second signals being decodable to recover the same uncoded user message. Preferably, the receiver is adapted for use in a mobile telecommunications system. In particular, it is preferred if the telecommunications system uses spread spectrum techniques, e.g. it may be a Code Division Multiple Access (CDMA) system. It is preferred if the original user information may be reconstructed from either a combination of the two signals of the received signals and/or from each of the received signals. In one of the embodiments of the present invention, the signals are punctured whereby the bits which are punctured in the first signal are different from the bits punctured in the second signal. Preferably, the forward error correction code is a convolutional or a turbo code.

The present invention also includes a method of operating a receiver in a telecommunications system, comprising the steps of: receiving a first forward error correction coded first signal; receiving a second forward error correction coded second signal substantially simultaneously with the first signal, each of the first and second signals having a different forward error correction coding and each of the first and second signals being decodable to recover substantially the same uncoded user message; and decoding the first and second received signals to obtain the user message. It is preferred if the original user message may be reconstructed from either a combination of the two decoded signals and/or from each of the decoded received signals. In one of the embodiments of the present invention, the signals are punctured whereby the bits which are punctured in the first signal are different from the bits punctured in the second signal. Preferably, the forward error correction code is a convolutional or a turbo code.

The present invention also includes a transmitter system comprising one or more transmitters, the one or more transmitters including a forward error correction coder; wherein the transmitter and the forward error correction coder are adapted to transmit a first and a second forward error correction coded signal, each signal nominally containing the same user information, substantially simultaneously over separate first and second telecommunication channels, respectively, the forward error correction coding of the first signal being different from the forward error coding of the second signal.

The present invention also includes a forward correction coder adapted to transmit a first and a second forward error correction coded signal, each signal nominally containing the same user information, substantially simultaneously over separate first and second telecommunication channels, respectively, the forward error correction coding of the first signal being different from the forward error coding of the second signal.

The present invention also includes a forward error correction decoder, for substantially simultaneously decoding a first forward error correction coded signal and a second forward error correction coded signal, each of the first and second signals having a different forward error correction coding and each of the first and second signals being decodable to recover the same uncoded user message.

The dependent claims define further individual embodiments of the present invention. The present invention will now be described with reference to the following drawings.

DESCRIPTION OF THE ILLUSTRATIVE EMBODIMENTS

The present invention will be described with reference to certain embodiments and drawings but the invention is not limited thereto but only by the claims. Further, the present invention will mainly be described with reference to a spread spectrum cellular mobile telephone system but the invention is not limited thereto and includes within its scope any telecommunications system.

Figure 1:
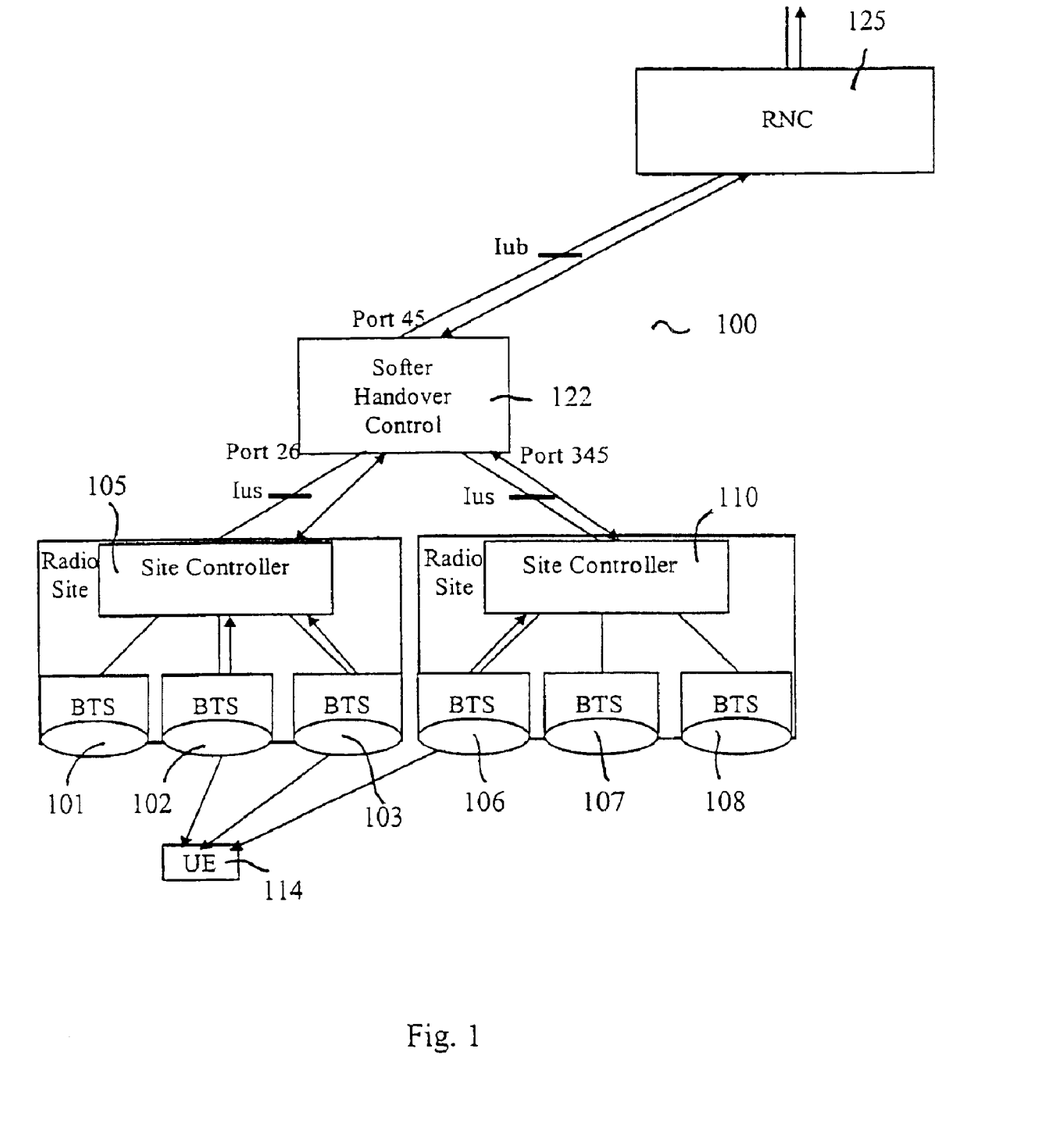
FIG. 1 is a schematic representation of a telecommunications network with which the present invention may be used.

FIG. 1 is a schematic representation of a part of mobile telecommunications network 100 in which a mobile terminal 114 may communicate with more than one base station 101–103, 106–108 simultaneously via radio links on a radio air interface. As an example, the communication system 100 may use a spread spectrum access method for the mobile terminal 114 e.g. a CDMA, an FDMA/CDMA, a TDMA/CDMA, or an FDMA/FDMA/CDMA system or similar any of which may be narrow or wide band, in particular system 100 may be any system using direct sequence spread spectrum techniques. Alternatively, any method of providing simultaneous communication from more than one base station to the mobile terminal 114 may be used, e.g. as described in U.S. Pat. No. 5,577,047 and U.S. Pat. No. 5,483,668. Typically, each base station 101–103; 106–108 will transmit a beacon or pilot signal which can be processed by any mobile terminal 114. In an exemplary CDMA system, each base station 101–103; 106–108 transmits a pilot signal having a common PN spreading code that is offset in code phase from the pilot signal of other base stations. During system operation, the mobile terminal 114 is provided with a list of code phase offsets corresponding to neighboring base stations surrounding the base station through which a communication is established. The mobile terminal 114 (depicted schematically FIG. 2) is equipped with a searching element 44 that allows the mobile terminal 114 to track the signal strength of the pilot signal from a group of base stations including neighboring base stations to the base stations 102, 103, 106 with which the mobile terminal 114 is communicating simultaneously. The pilot signal will be typically used by a mobile terminal 114 for initial synchronization.

Each group of base stations 101–103; 106–108 may be controlled by a site controller 105; 110. Each triplet of base stations 101–103; 106–108 may serve the three sectors of one geographical site. Site controllers 105; 110 communicate with a base station controller or network controller (RNC) 125 which in turn may be connected to other switches within the network and to other networks such as a pubic telephone network (PSTN). In particular, network 100 may be configured so that each RNC 125 can communicate with any of its neighbor RNC's directly. The protocols used for communicating between the RNC, the site controllers and other switches in the networks are not considered to be a limitation on the present invention and may be, for example, an IP, and IP/TCP, an ATM protocol or any other suitable protocol. A softer handover controller (SHC) 122 may be associated with one or more site controllers 105, 110 and may be provided for combining signals from several base stations 102, 103, 106 to improve overall reception.

As shown in FIG. 1 the mobile terminal 114 is communicating simultaneously with base stations 102, 103, 106 via three radio links in a soft handover situation. Thus, base stations 102, 103, 106 are in the Active set of mobile terminal 114. Several methods are known from improving the quality of digital transmissions over a potentially noisy radio link. Interleaving is the concatenation of bits from different bytes, frames, or blocks of data. Any disturbance may corrupt data but the corrupted data will be spread through a plurality of bytes, frames or blocks respectively and therefore has a less harmful effect. The choice of the method of interleaving is not considered to be a limitation on the present invention. Various forms of modulation are known such as QPSK, GMSK, etc. Modulation may affect the size and number of side-lobes of the transmission and may therefore influence inter-channel interference as well as inter-symbol interference. The choice of modulation technique is not considered to be a limitation on the present invention. Various forms of forward error correction are known including convolutional and block coding. In accordance with the present invention digital signals transmitted may include one or more classes of data, any number of which may be included in a single message, e.g. class I data may be highly protected with the safest error correction coding; class II data may have less priority and may include a type of coding in which some of the bits are removed, sometimes called puncturing, in order to improve data rate with some loss in correction capability; class III data may be protected only by parity or check sum bits so that certain types of error may be detected but no correction can be carried out, at least from only one transmitted message; and class IV data may have no correction or error coding. In accordance with the present invention at least a part of each signal includes a forward error correction coded portion.

Figure 2:
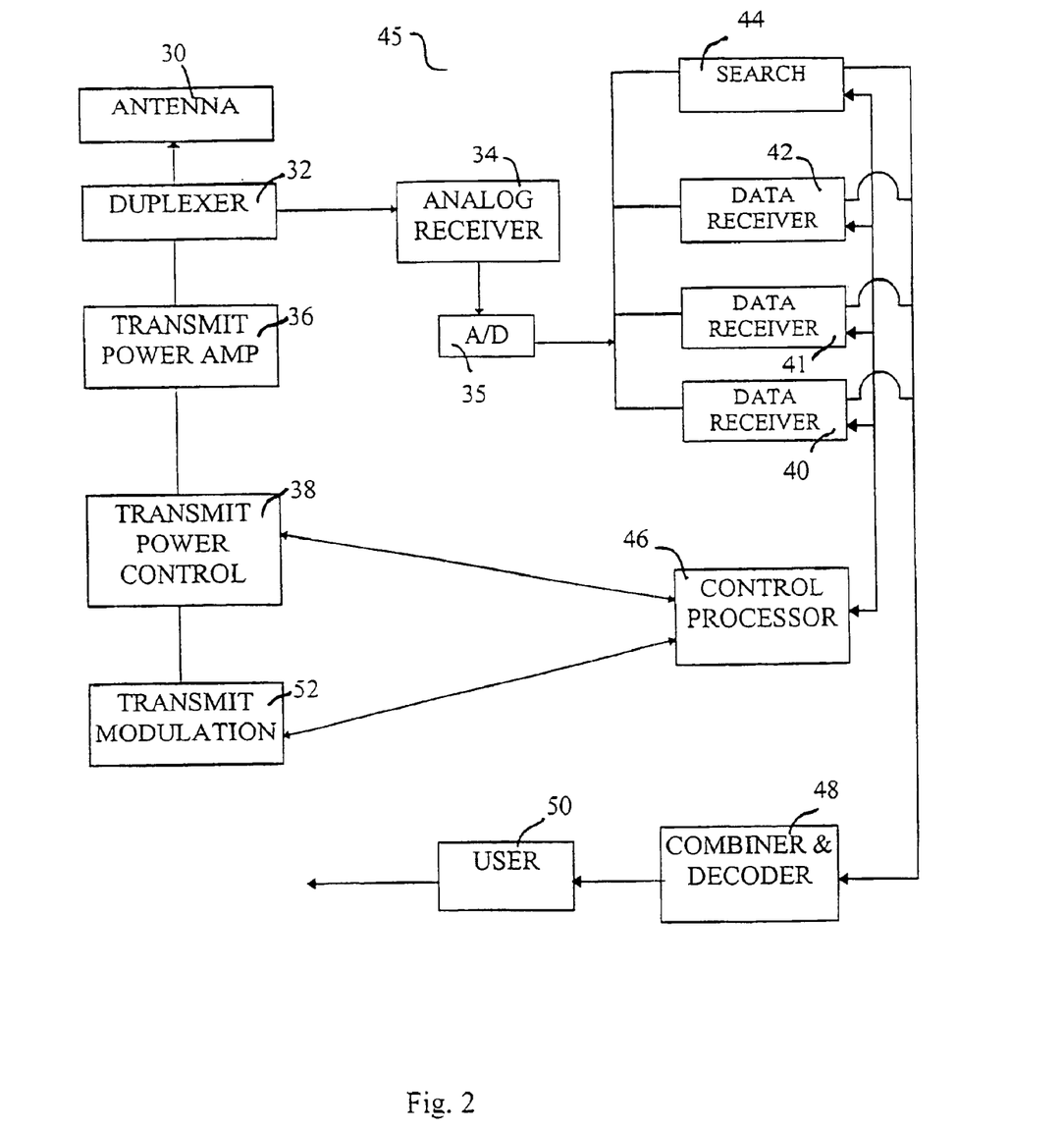
FIG. 2 is a schematic representation of a receiver in accordance with one embodiment of the present invention.
Figure 3:
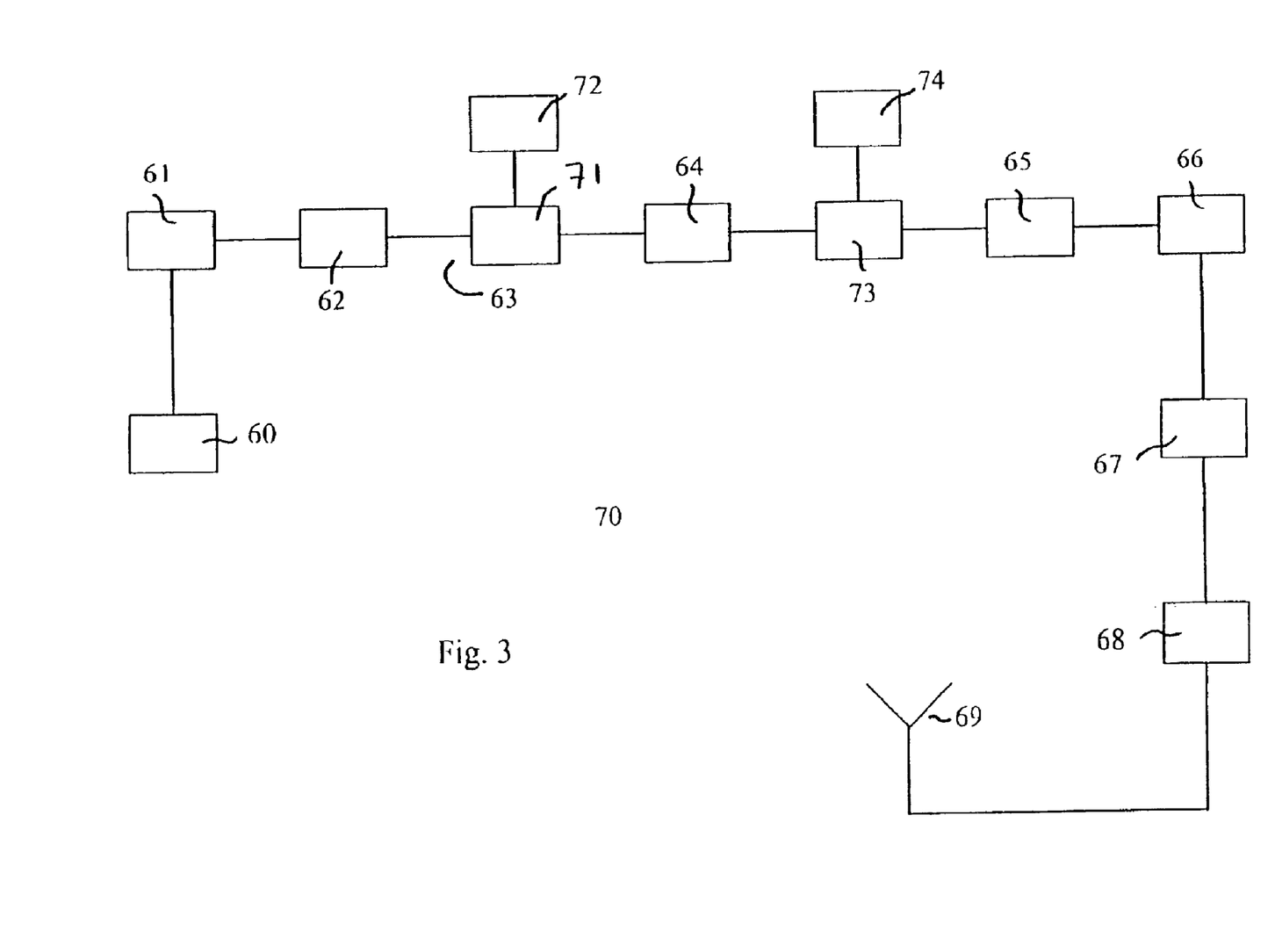
FIG. 3 is a schematic representation of a transmitter in accordance with an embodiment of the present invention.

FIGS. 2 and 3 are schematic representations of a mobile terminal receiver (FIG. 2) and a base station transceiver (FIG. 3) in accordance with one embodiment of the present invention. In FIG. 3 a single forward error correction coder and a single antenna 69 is shown but the present invention is not limited thereto but includes within its scope a transmitter which includes a plurality of coders and a plurality of antennae for transmitting two or more forward error correction coded messages whereby the forward error correction coding of each message is different despite the fact that the user message which is being coded is the substantially the same in each case. The telecommunications system according to the present invention preferably uses punctured convolutional coding and includes a coder 61–63 for coding a digital input to be transmitted from a transmitter 70 and a decoder 48 for decoding the coded input received at the receiver 45. Any conventional coding scheme may be used which allows of puncturing, for example, conventional convolutional coding or turbo coding as described in the article by V. Berrou, A. Glavieux, P. Thitimajshima, entitled "Near Shannon limit error-correcting coding and decoding: Turbo codes (1)" Proceedings of the IEEE Int. Conf. on. Communications (ICC'93), pages 1064–1070. Details of modulation and interleaving will not be described. The coder 61–63 includes a convolutional coding circuit 62 and a puncturing circuit 63 which receive the digital input from a data source 60 and output a punctured convolutional coded output. Optionally, the data from the data source 60 may first be coded in an error detection encoder 61 which may encode the data with a conventional error detection code, e.g. a cyclic redundancy code. The data source 60 may include any suitable digital data, e.g. digital data from a personal computer, vocoded speech data. The digital input is coded by the convolutional coding circuit 62 so that for every k-bits inputted into the coding circuit 62, a corresponding n-bits, where n>k, is outputted. The k-bits inputted and the corresponding n-bits outputted are referred to as k-tuples and n-tuples, respectively. A convolutional coding rate for the convolutional coding circuit 62 is defined as the ratio of the number of k-bits inputted to the number of n-bits outputted, and can be expressed as k/n. For example, the coding rate is 1/2 when for each bit inputted into the convolutional coding circuit 62 there is a corresponding two bits outputted.

In order to increase the code rate of the coder 61–63, the convolutional coded output is passed through a puncturing circuit 63 which includes a transmission mask circuit 71 and deleting pattern memory 72 for transmitting only selected bits of the convolutionally coded output. The puncturing circuit 63 outputs a punctured output having a punctured code rate of z/q, i.e. for every z bits input to the conventional coding circuit 62, q bits are output from the puncturing circuit 63.

The desired punctured code rate is achieved by passing a convolutional coded output through the transmission mask circuit 71 and puncturing the convolutional coded output on a packet-by-packet basis. Each packet to be punctured is formed from a plurality of n-tuples and is called a puncturing packet. The number r of n-tuples used to form each puncturing packet may be determined by recognizing that to provide a punctured code rate of z/q, where z=r.k, for a convolutional coded output of rate k/n, at least r convolutionally coded n-tuples must be grouped and punctured as a puncturing packet to achieve the desired punctured code rate. Accordingly, the bit length of each puncturing packet is equal to r convolutionally coded n-tuples multiplied by the number of bits in each n-tuple. The bit length of the puncturing packet can be expressed as L=r.n.

The puncturing packets are punctured according to a deleting pattern which has a length equal to that of a puncturing block. The deleting pattern is stored in the memory 72 as a puncturing matrix. The bits of the puncturing matrix have a one-to-one correspondence with the bits in each of the puncturing packets. Accordingly, the deleting pattern is chosen to have a length that can be expressed as L=r. n. The deleting pattern chosen has the minimum bit length necessary to achieve the desired punctured code rate of z/q for a convolutional coding rate of k/n.

The deleting pattern used by the puncturing circuit 63 is an L-length block of ones and zeros, with each one representing a transmission bit and each zero representing a non-transmission bit. (The transmission bits and non-transmission bits are also referred to as non-deleting bits and deleting bits, respectively.) The ratio of ones to zeros in the Llength deleting pattern is chosen to achieve the desired punctured code rate. It is the ratio of ones to zeros in the deleting pattern that determines the punctured code rate.

For example, a 2/3 punctured rate is achieved for a rate 1/2 convolutional coding circuit by using a deleting pattern of length four (i.e., L=zn=2.times.2=4). The length four deleting pattern is chosen to have three transmission bits and one non-transmission bit so that the new punctured rate of 2/3 is achieved.

There are a plurality of different deleting patterns having the same ratio of ones to zeros and having the same bit length but having unique arrangements or patterns of ones and zeros. These various patterns may be stored in the memory 72 as puncturing matrices and one may be chosen for any transmission from a base station 101–103, 106–108 before communication with the mobile terminal 114 and may be transmitted to the mobile terminal 114 over a signaling channel when setting up the radio link from the base station 101–103, 106–108 to the terminal 114. Alternatively, the puncturing matrix may be selected by the mobile terminal 114. The arrangement or pattern of ones and zeros in a deleting pattern affects the distance properties of the punctured code. To minimize the bit error rate of the communication system, a deleting pattern having the desired bit length and ratio of ones to zeros is typically chosen in an attempt to optimize the distance properties of the punctured code.

To transmit the punctured packets the output of the puncturing circuit 63 is modulated in a modulator 64 which modulates the packets with a base band signal. The modulation may be analog or digital and for instance may be digital in which case the digital signal is converted to an analog signal in a D/A converter 65 and up-converted in an upconverter 66 which is then amplified in an amplifier 67, filtered in band pass filter 68 to remove extraneous frequencies, and transmitted from antenna 69. To spread the signal a spreading operator 73 may modulate the punctured bits with a PN-code from a pn-code generator 74. It is considered that the method of spreading the signal is not a limitation on the present invention.

In accordance with this embodiment of the present invention, a different puncturing matrix is used for each of the simultaneous transmissions over the respective radio links from the two or more base stations 102, 103, 106 to a receiving mobile terminal 114 which is communicating with the base stations 102, 103, 106. The radio links from base stations 102, 103, 106 are spaced apart geographically so that there is a very high probability that there is little or no correlation between the disturbances on one radio link in comparison with any other.

In the receiver 45 of the mobile terminal 114, the received signals are directed from the antenna 30 to the receiver circuitry by duplexer 32. In the analog converter 34 the received analog signals are frequency downconverted to an IF signal. The digital signals are then recovered from the IF signal by means of an A/D converter 35. The output of the A/D converter 35 may contain the signals of many calls with the pilot signals from several base stations 101–103, 106–108. The function of receivers 4042 is to correlate the IF signal with the PN-code used by each of the currently transmitting base stations 102, 103, 106 and thus to isolate and despread the respective signals. Also the data receivers 40 to 42 demodulate the signals so that the outputs from the data receivers 40–42 are the three convoluted messages from the base stations 102, 103 and 106. Each of these signals contains the same convoluted messages but each has been punctured with a different puncturing matrix. The outputs from the data receivers 40 to 41 are now fed to a combiner and decoder 48 which adjusts the timing of the various outputs so that they are synchronized, combines the signals as described below and decodes them, e.g. convolution decoding, to form a single optimized output. This is passed to the user circuitry 50 and hence to a loudspeaker of a handset or other form of display. User circuit 50 may include a vodecoder, for instance, when the received signals are vocoded voice signals.

Figure 4:
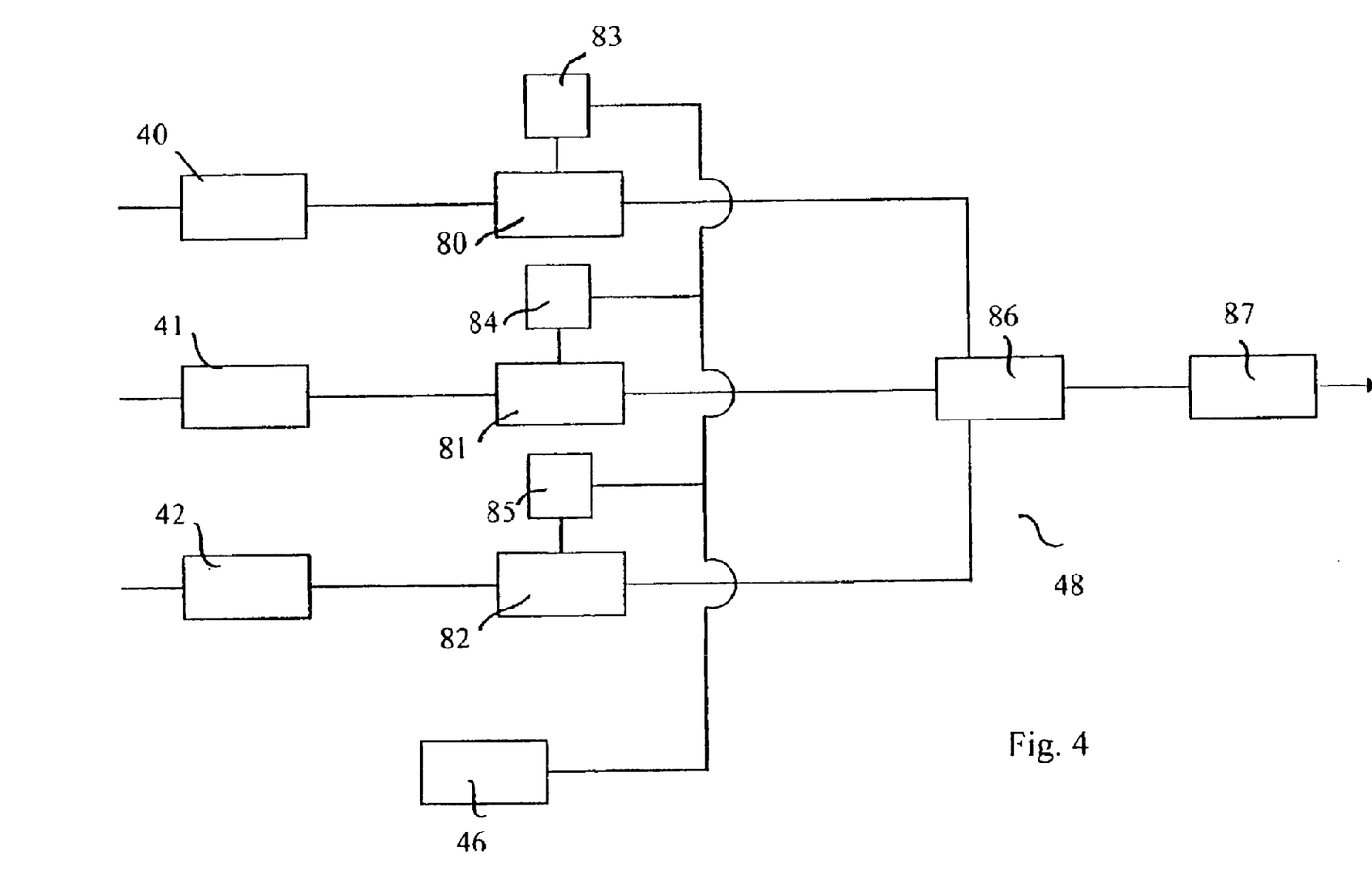
FIG. 4 is a schematic representation of a decoder and combiner in accordance with one embodiment of the present invention.

The combiner 48 may be configured in several different ways each of which is a separate embodiment of the present invention. For example as shown schematically in FIG. 4, the outputs of data receivers 40 to 42 may each be fed to a depuncturing circuit 80–82, respectively. The puncturing matrix used for each transmission is known to the mobile terminal 114 as indicated above. The control processor 46 selects the appropriate depuncturing matrix from the respective memory 83–85, and each signal is depunctured accordingly. The digital data is preferably electrically neutral, i.e. for the binary logical values, "1" and "0", the physical signals are have an amplitude "1" and "−1" or vice versa in some arbitrary units. For each position where a bit has been punctured a gap or a "0" is left in the data stream. This gap or 0 represents a neutral value between the extremes of 1 and −1. It will be appreciated by the skilled person that the received signals do not consist of a series of perfect 1's and −1's, but rather, due to distortions and interference, each individual value may vary from its intended value. For example, the received signal may be −0.8, +0.3, +0.7, #, −0.9 . . . where # represents a missing (punctured) bit which has been removed from the sequence in the transmitter 70. After depuncturing this sequence becomes −0.8, +0.3, +0.7, 0, −0.9 . . . . Once each of the three signals has been depunctured and aligned with all the others, the signals may be physically added in an adder 86 and passed to a suitable comvolutional decoder 87, e.g. a Viterbi decoder which is well known to the skilled person.

Figure 5:
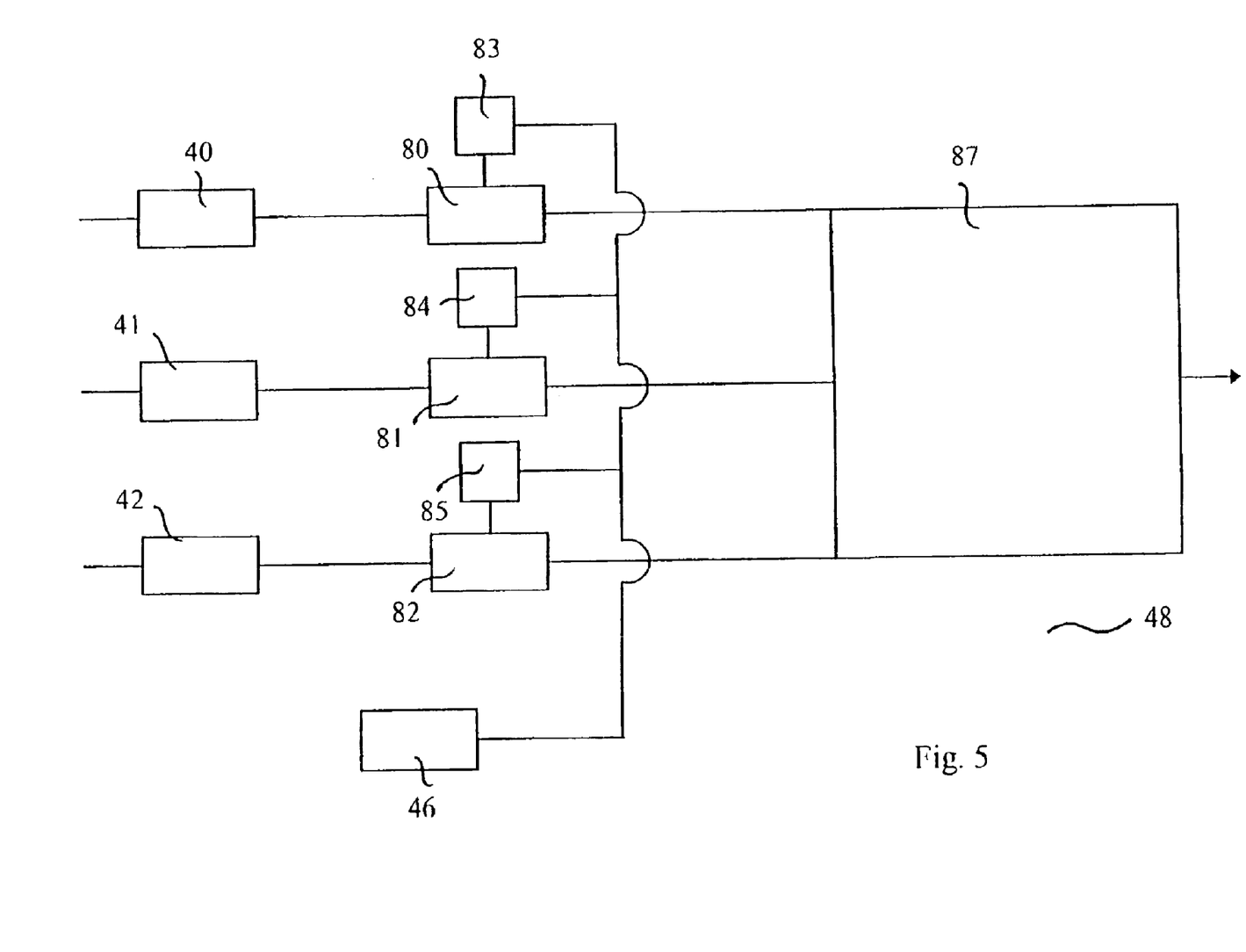
FIG. 5 is a schematic representation of a decoder and combiner in accordance with another embodiment of the present invention.

An alternative embodiment of the decoder and combiner 48 is shown schematically in FIG. 5. In this embodiment the three data streams from the data receivers 40–41 are fed to depuncturing circuits 80–82 as described for the previous embodiment with reference to FIG. 4. In this embodiment the three outputs of the depuncturing circuits 80–82 are fed to a hard-decision, multi-input convolutional decoder 87, e.g. a Viterbi decoder as described in the article by A. J. Viterbi entitled "Error bounds for convolutional codes and an asymptotically optimum decoding algorithm", IEEE Trans. Inf. Theory, vol. IT 13 pages 260–269, April 1967. In the decoder 87 all the input streams are decoded simultaneously to a single output.

Figure 6:
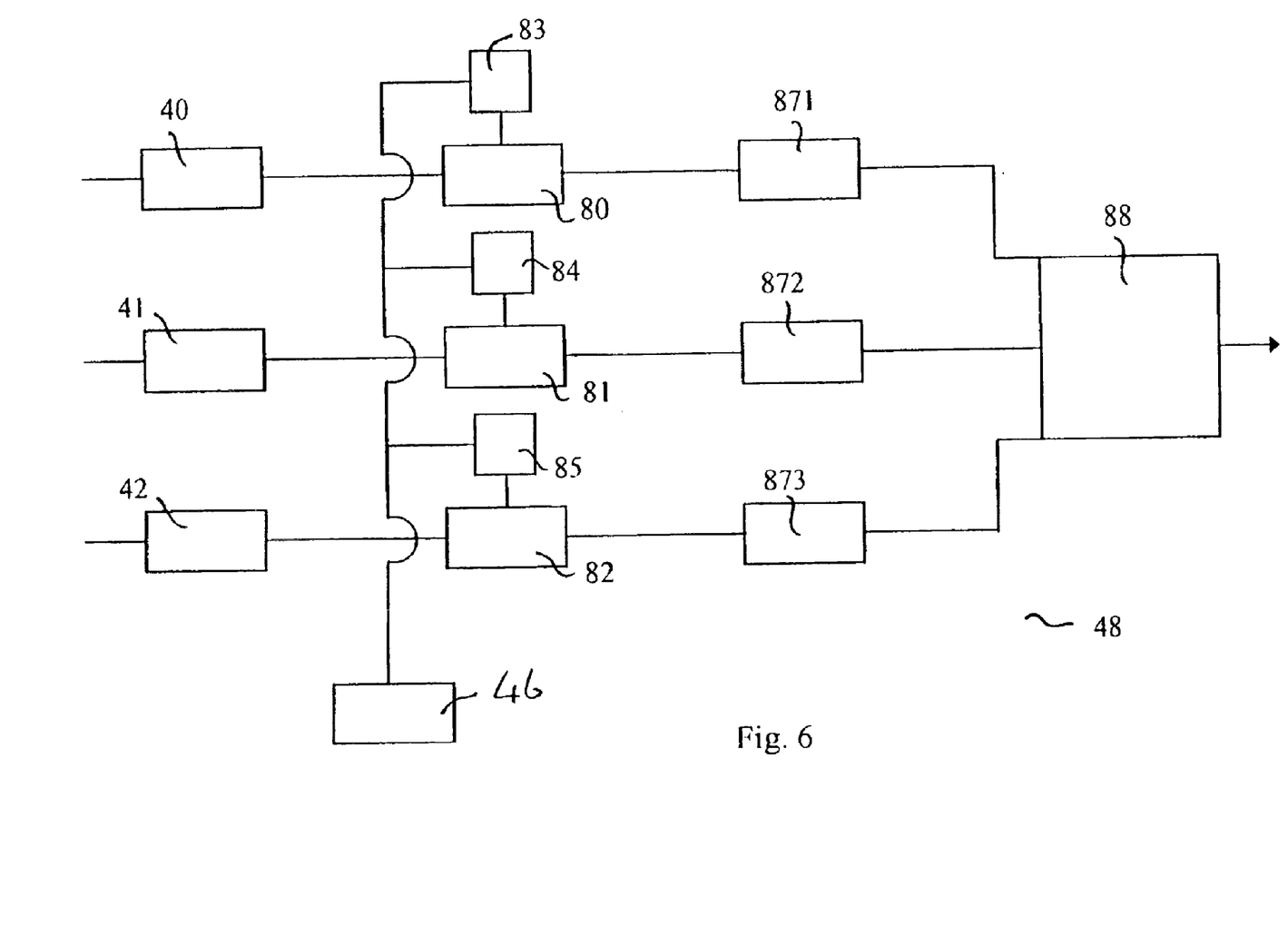
FIG. 6 is a schematic representation of a decoder and combiner in accordance with another embodiment of the present invention.

Yet another embodiment of the combiner and decoder 48 is shown schematically in FIG. 6. In this embodiment each output from the depuncturing circuits 80–81 is fed to a soft-decision Viterbi decoder 871, 872, 873. Soft decision Viterbi decoders are known to the skilled person and their output is a series of probabilities of a 1 or a −1 rather than a series of hard decisions as to 1's and −1's. These streams of probabilities are fed to a comparitor 88. In comparitor 88 each bit of each data stream is compared with the same bit from the other data streams and a final decision made as to whether the bit is 1 or −1 based on a suitable algorithm. The skilled person will be aware of several possibilities of manipulating the soft decision values input into comparitor 88 to obtain a more secure estimation of the bit value. For instance, the comparitor 88 may be adapted to select the bit from the stream having the largest probability. Alternatively, the comparitor 88 may first take an average of all the probabilities for one bit from the three streams and then make a decision based on this final probability. Alternatively, instead of a simple average, an average of the squares of the probabilities for each bit may be used for the decision, the sign for the bit being obtained from the simple average.

While the invention has been shown and described with reference to preferred embodiments, it will be understood by those skilled in the art that various changes or modifications in form and detail may be made without departing from the scope and spirit of this invention as defined in the attached claims. For instance although in the above description the depuncturing unit, the combiner and the decoder have all been described in one receiver, these circuits could be distributed in the network, for instance, the depuncturing unit may be placed in the receiver close to the antenna but the combining and decoding circuit could be placed elsewhere. Also a single receiver has been described for receiving the two signals with different forward error correction coding but the present invention includes a receiver for each signal and the decoding and combining is carried out on the output of these two receivers. Similarly, each forward error correction coded signal may be transmitted by transmitters separated geographically or may be sent from a single transmitter with a plurality of antennae.

The present invention includes a telecommunications system and method of operating a telecommunications system which is adapted for: transmitting substantially simultaneously over separate first and second telecommunication channels a first and a second forward error correction coded signal, respectively, each of the first and second signals nominally containing the same user information; forward error correction coding at least a portion of the first signal; and forward error correction coding at least a portion of the second signal, the forward error correction coding of the portion of the first signal being different from the forward error correction coding of the portion of the second signal. The forward error coding method for the two portions may be the same but the portions used for the error coding are then different in the two messages. This results in transmitting two coded messages in parallel, in which each coded message has a common portion which is identical in both coded messages and a portion which differs from the other coded message of the pair. The reconstruction of the user messages from either coded message of a pair results in substantially the same message in each case (except for errors resulting from incomplete reconstruction). Similarly, the present invention includes a telecommunications receiver system and a method of operating the same, for substantially simultaneously decoding the first forward error correction coded signal and the second forward error correction coded signal as defined above as well as one or more transmitters and a methof of operating the same for transmitting the first and the second forward error correction coded signals as defined above.

The present invention also includes a forward correction coder adapted to transmit the first and the second forward error correction coded signal and a forward error correction decoder for receiving and substantially simultaneously decoding the first forward error correction coded signals as defined above.

What is claimed is:

1. A method of operating a telecommunications system comprising the steps of:

transmitting substantially simultaneously over separate first and second telecommunication channels a first and a second forward error correction coded signal, respectively, each of the first and second signals containing the same user information and the first and second signals being digital signals;

forward error correction coding at least a portion of the first signal; and forward error correction coding at least a portion of the second signal;

characterised in that the forward error correction coding of the first and second signals includes the step of puncturing and the bits which are punctured from the portion of the first signal are different from the bits punctured from the portion of the second signal.

2. The method according to claim 1, characterised in that the forward error correction coding of the first and second signals includes convolutional or turbo coding.

3. The method according to claim 1, further characterised by the steps of receiving the forward error correction coded first and second signals; and decoding the first and, second forward error correction coded signals to obtain the user information.

4. The method according to claims 3, characterised in that the decoding step is preceded by a depuncturing step.

5. The method according to claim 3, characterised in that the decoding step includes one of:

depuncturing each of the first and second forward error correction coded signals separately, combining the first and second depunctured signals and then decoding the combined signal;

depuncturing each of the first and second forward error correction coded signals separately and then decoding and combining the first and second signals simultaneously in a multi-input decoder;

depuncturing each of the first and second forward error correction coded signals separately, soft decoding each of the first and second depunctured coded signals separately, and then selecting on a bit-by-bit basis from the first and second soft decoded signals.

6. The method according to claim 1, characterised in that the telecommunications system is a mobile radio telecommunications system.

7. The method according to claim 1, characterised in that the first and second forward error correction coded signals are spread spectrum signals.

8. The method according to claim 1, characterised in that the telecommunications system is a code division multiple access system.

9. A method of operating a receiver in a telecommunications system, comprising the steps of: receiving a first forward error correction coded first signal; receiving a second forward error correction coded second signal substantially simultaneously with the first signal, each of the first and second signals having a different forward error correction coding, each of the first and second signals being decodable to recover substantially the same uncoded user message and the first and second signals being digital signals; and decoding the first and second received signals to obtain the user message, characterised in that and the forward error correction decoding of the first and second signals includes the step of depuncturing and the bits which are punctured from the first signal are different from the bits which are punctured from the first signal are different from the bits punctured from the second signal.

10. The method according to claim 9, characterised in that the forward error correction coding of the first and second signals includes convolutional or turbo coding.

11. The method according to claims 9, characterised in that the decoding step is preceded by the depuncturing step.

12. The method according to claim 9, characterised in that the decoding step includes one of:

depuncturing each of the first and second forward error correction coded signals separately, combining the first and second depunctured signals and then decoding the combined signal;

depuncturing each of the first and second forward error correction coded signals separately and then decoding and combining the first and second signals simultaneously in a multi-input decoder;

depuncturing each of the first and second forward error correction coded signals separately, soft decoding each of the first and second depunctured coded signals separately, and then selecting on a bit-by-bit basis from the first and second soft decoded signals.

13. The method according to claim 9, characterised in that the telecommmunciations system is a mobile radio telecommunications system.

14. The method according to claim 9, characterised in that the first and second forward error correction coded signals are spread spectrum signals.

15. The method according to claim 9 characterised in that the telecommunications system is a code division multiple access system.

16. A transmitter system comprising one or more transmitters, the one or more transmitters comprising one or more forward error correction coders; wherein the one or more transmitters and the one or more forward error correction coders transmit, substantially simultaneously over separate first and second telecommunication channel, respectively a first and a second forward error correction coded signal, the first and second signals being digital signals, each signal nominally containing the same user information, characterised in that the forward error correction coder includes a puncturing unit and in the puncturing unit the bits which are punctured from the first signal are different from the bits punctured from the second signal.

17. The system according to claim 16, characterised in that the forward error correction coding of the first and second signals includes convolutional or turbo coding.

18. The system according to claim 16, characterised in that the telecommunications system is a mobile radio telecommunications system.

19. The system according to claim 16, characterised in that the first and second forward error correction coded signals are spread spectrum signals.

20. The system according to claim 16 characterised in that the telecommunications system is a code division multiple access system.

21. A telecommunications system comprising:

one or more transmitters and one or more receivers; the one or more transmitters including one or more forward error correction coders; wherein the one or more transmitters and the one or more forward error correction coders transmit, substantially simultaneously over separate first and second telecommunication channels, respectively a first and a second forward error correction coded signal, the first and second signals being digital signals, each signal nominally containing the same user information, characterised in that the forward error correction coder includes a puncturing unit and in the puncturing unit the bits which are punctured from the first signal are different from the bits punctured from the second signal.

22. The telecommunications system according to claim 21, further characterised by:

one or more receivers comprising:

a forward error correction decoder for substantially simultaneously decoding the first forward error correction coded signal and the second forward error correction coded signal, each of the first and second signals being decodable to recover the same uncoded user message, the first and second signals being digital signals and the forward error correction decoder including a depuncturing unit, and in the de-puncturing unit the bits which are de-punctured from the first signal are different from the bits de-punctured from the second signal.

23. The system according to claim 22, characterised in that the depuncturing unit and the decoder are adapted for one of the following:

the depuncturing unit depunctures each of the first and second forward error correction coded signals separately and the decoder decodes each of the depunctured signals separately;

the depuncturing unit depuncture each of the first and second forward error correction coded signals separately, and the decoder comprises a combiner which combines the first and second depunctured signals and subsequently the decoder decodes the combined signal; the decoder is a multi-input decoder, the depuncturing unit depunctures each of the first and second forward error correction coded signals separately and then the decoder decodes and combines the first and second signals simultaneously;

the decoder includes a soft decoder and a combiner, the depuncturing unit depunctures each of the first and second forward error correction coded signals separately, the decoder soft decodes each of the first and second depunctured coded signals separately, and then the combiner combines the decoded first and second signals by selecting on a bit-by-bit basis from the first and second soft decoded signals in a selector.

24. The system according to claim 21, characterised in that the forward error correction coding of the first and second signals includes a convolutional or turbo coding.

25. The system according to claim 21, characterised in that the telecommunication system is a mobile radio telecommunications system.

26. The system according to claim 21 characterised in that the first and second forward error correction coded signals are spread spectrum signals.

27. The system according to claim 21 characterised in that the telecommunications system is a code division multiple access system.

28. A mobile radio terminal comprising the transmitter system of claim 21.

29. A telecommunications receiver system, comprising:

one or more receivers comprising:

a forward error correction decoder for substantially simultaneously decoding a first forward error correction coded signal and a second forward error correction coded signal, each of the first and second signals being decodable to recover the same uncoded user message, the first and second signals being digital signals, characterised in that the forward error correction decoder including a de-puncturing unit, and in the de-puncturing unit the bits which are de-punctured from the first signal are different from the bits de-punctured from the second signal.

30. The system according to claim 29, characterised in that the forward error correction coding of the first and second signals includes convolutional or turbo coding.

31. The system according to claim 29, characterised in that the depuncturing unit and the decoder are adapted for one of the following:

the depuncturing unit depunctures each of the first and second forward error correction coded signals separately and the decoder decodes each of the depunctured signals separately;

the depuncturing unit depunctures each of the first and second forward error correction coded signals separately, and the decoder comprises a combiner which combines the first and second depunctured signals and subsequently the decoder decodes the combined signal;

the decoder is a multi-input decoder, the depuncturing unit depunctures each of the first and second forward error correction coded signals separately and then the decoder decodes and combines the first and second signals simultaneously;

the decoder includes a soft decoder and a combiner, the depuncturing unit depunctures each of the first and second forward error correction coded signals separately, the decoder soft decodes each of the first and second depunctured coded signals separately, and then the combiner combines the decoded first and second signals by selecting on a bit-by-bit basis from the first and second soft decoded signals in a selector.

32. The system according to claim 29 characterised in that the telecommunications system is a mobile radio telecommunications system.

33. The system according to claim 29 characterised in that the first and second forward error correction coded signals are spread spectrum signals.

34. The system according to claim 29 characterised in that the telecommunications system is a code division multiple access system.

35. A mobile radio terminal comprising the receiver system of claim 29.

36. A forward correction coder adapted to transmit a first and a second forward error correction coded signal, each signal nominally containing the same user information, substantially simultaneously over separate first and second telecommunication channels, respectively, the first and second signals being digital signals characterised in that the forward error correction coder includes a puncturing unit and in the puncturing unit the bits which are punctured from the first signal are different from the bits punctured from the second signal.

37. A forward error correction decoder, for substantially simultaneously decoding a first forward error correction coded signal and a second forward error correction coded signal, the first and second forward error correction coded signals being digital signals and each of the first and second signals being decodable to recover the same uncoded user message, characterised in that the forward error correction decoder includes a de-puncturing unit, and in the de-puncturing unit the bits which are de-punctured from the first signal are different from the bits de punctured from the second signal.

* * * * *